US012603487B2

(12) United States Patent
Yao et al.

(10) Patent No.: US 12,603,487 B2
(45) Date of Patent: Apr. 14, 2026

(54) BUSHING AND MANUFACTURING METHOD THEREFOR

(71) Applicant: Hitachi Energy Ltd, Zürich (CH)

(72) Inventors: Danan Yao, Anhui (CN); Peirong Cai, Anhui (CN)

(73) Assignee: Hitachi Energy Ltd, Zurich (CH)

( * ) Notice: Subject to any disclaimer, the term of this patent is extended or adjusted under 35 U.S.C. 154(b) by 453 days.

(21) Appl. No.: 17/641,639

(22) PCT Filed: Sep. 10, 2020

(86) PCT No.: PCT/EP2020/075396
§ 371 (c)(1),
(2) Date: Mar. 9, 2022

(87) PCT Pub. No.: WO2021/048312
PCT Pub. Date: Mar. 18, 2021

(65) Prior Publication Data
US 2022/0360063 A1      Nov. 10, 2022

(30) Foreign Application Priority Data

Sep. 10, 2019    (CN) .......................... 201910855008.9

(51) Int. Cl.
| *H02G 3/22* | (2006.01) |
| *H01B 13/00* | (2006.01) |
| *H01F 27/04* | (2006.01) |

(52) U.S. Cl.
CPC ........... *H02G 3/22* (2013.01); *H01B 13/0036* (2013.01); *H01F 27/04* (2013.01)

(58) Field of Classification Search
CPC ..... H01B 13/0036; H01B 17/26; H01F 27/04; H02G 3/22
See application file for complete search history.

(56) References Cited

U.S. PATENT DOCUMENTS

| 4,629,822 A * | 12/1986 | Kitamura ............... | H01B 17/34 |
| | | | 174/12 BH |
| 7,575,371 B1 * | 8/2009 | Yakymyshyn ......... | G01N 29/07 |
| | | | 702/159 |

(Continued)

FOREIGN PATENT DOCUMENTS

| CN | 107787513 A | 3/2018 |
| CN | 208690084 U | 4/2019 |

(Continued)

OTHER PUBLICATIONS

International Search Report and Written Opinion of the International Searching Authority, PCT/EP2020/075396, mailed Nov. 30, 2020, 14 pages.

(Continued)

*Primary Examiner* — Timothy J Thompson
*Assistant Examiner* — Rhadames Alonzo Miller
(74) *Attorney, Agent, or Firm* — Sage Patent Group

(57) ABSTRACT

The present disclosure relates to a bushing and a manufacturing method therefor. The bushing includes a conductive tube and a central tube. The conductive tube is fixedly connected to a bottom connecting assembly and a top connecting assembly. The central tube is fixedly connected to the bottom connecting assembly and the top connecting assembly. The central tube is subjected to a compressive force in an extending direction of the central tube, such that the conductive tube is subjected to a tensile force in an extending direction of the conductive tube. The embodiments of the present disclosure can eliminate or reduce creep or stress relaxation of composites to ensure mechanical properties and sealing performance in a life cycle of the bushing.

19 Claims, 3 Drawing Sheets

(56)     References Cited

U.S. PATENT DOCUMENTS

| | | | | |
|---|---|---|---|---|
| 10,210,969 | B2 | 2/2019 | Sjoberg et al. | |
| 2004/0046568 | A1* | 3/2004 | Unsworth | G01R 31/1272 |
| | | | | 324/536 |
| 2011/0031980 | A1* | 2/2011 | Kruger | G01R 31/62 |
| | | | | 324/547 |
| 2011/0301880 | A1* | 12/2011 | Stenestam | G05B 19/0428 |
| | | | | 702/50 |
| 2013/0306368 | A1* | 11/2013 | Eriksson | H01B 17/005 |
| | | | | 174/650 |
| 2016/0154051 | A1* | 6/2016 | Watson | G01R 31/1272 |
| | | | | 324/552 |
| 2016/0238412 | A1* | 8/2016 | Germann | G01B 7/00 |
| 2017/0227592 | A1* | 8/2017 | Berler | G01R 31/62 |
| 2018/0332726 | A1* | 11/2018 | Zhu | H01R 12/716 |
| 2019/0277805 | A1* | 9/2019 | Wrobel | G01N 29/032 |

FOREIGN PATENT DOCUMENTS

| | | | | | |
|---|---|---|---|---|---|
| CN | 109786088 | A | * | 5/2019 | H01F 27/32 |
| EP | 0014967 | A1 | | 9/1980 | |
| EP | 2482290 | A1 | | 8/2012 | |
| EP | 3413319 | A1 | | 12/2018 | |
| GB | 443017 | A | | 2/1936 | |
| JP | S51113193 | A | | 10/1976 | |
| JP | S54111697 | A | | 9/1979 | |

OTHER PUBLICATIONS

Chinese First Office Action dated May 20, 2021 for Chinese Patent Application No. 201910855008.9, 16 pages.
Chinese Second Office Action dated Nov. 1, 2021 for Chinese Patent Application No. 201910855008.9, 11 pages.

* cited by examiner

BUSHING AND MANUFACTURING METHOD THEREFOR

CROSS REFERENCE TO RELATED APPLICATIONS

This application is a 35 U.S.C. § 371 national stage application of PCT International Application No. PCT/EP2020/075396 filed on Sep. 10, 2020, which in turns claims foreign priority to Chinese Patent Application No. 201910855008.9, filed on Sep. 10, 2019, the disclosures and content of which are incorporated by reference herein in their entirety.

TECHNICAL FIELD

The present disclosure relates to the electrical field, and in particular, to a bushing for use in a power transmission device, a method for manufacturing a bushing, and a transformer having the bushing.

BACKGROUND ART

Bushings are mainly used for ground insulation of incoming and outgoing lines of power devices such as transformers, reactors and circuit breakers, high-voltage wires passing through walls, etc. The bushings may include oil impregnated paper (OIP) bushings, resin impregnated paper (RIP) bushings, resin impregnated synthetic (RIS) bushings, RIS and RIN mixed bushings, etc., among which the OIP bushings are widely used.

Some conventional OIP has a ceramic shell. However, the ceramic shell is prone to crack, which may cause injury to nearby personnel and/or secondary damage to nearby devices. In addition, the bushing with the ceramic shell also leads to an increase in transportation costs, and has weak adaptability in regions with high altitudes and high earthquake risks.

Some improved solutions have been proposed. For example, a composite insulator is used to replace the ceramic shell. However, the conventional composite insulator (OIP) has some problems, such as creep or stress relaxation during the service life thereof.

SUMMARY

According to embodiments of the present disclosure, an improved bushing and a manufacturing method therefor are provided.

In a first aspect of the present disclosure, a bushing is provided. The bushing comprises a conductive tube and a central tube. The conductive tube is fixedly connected to a bottom connecting assembly and a top connecting assembly. The central tube is fixedly connected to the bottom connecting assembly and the top connecting assembly. The central tube is subjected to a compressive force in an extending direction of the central tube, such that the conductive tube is subjected to a tensile force in an extending direction of the conductive tube.

In a second aspect of the present disclosure, a transformer is provided. The transformer comprises a bushing according to the first aspect.

In a third aspect of the present disclosure, a method for manufacturing a bushing is provided. The method comprises fixedly connecting a conductive tube to a bottom connecting assembly; fixedly connecting a central tube to the bottom connecting assembly; applying a compressive force to the central tube and applying a tensile force to the conductive tube; and fixedly connecting the conductive tube and the central tube to a top connecting assembly while maintaining the compressive force and the tensile force, such that the central tube is subjected to the compressive force in an extending direction of the central tube and the conductive tube is subjected to the tensile force in an extending direction of the conductive tube.

The embodiments of the present disclosure can eliminate or reduce creep or stress relaxation of composites to ensure mechanical properties and sealing performance in a life cycle of the bushing.

It should be understood that what is described in the Summary is not intended to define key or important features of the embodiments of the present disclosure, and is not intended to limit the scope of the present disclosure. Other features of the present disclosure will be easily understood through the following description.

BRIEF DESCRIPTION OF THE DRAWINGS

The foregoing and other features, advantages and aspects of embodiments of the present disclosure become more apparent with reference to the following detailed description and in conjunction with the accompanying drawings. In the accompanying drawings, identical or similar reference numerals denote identical or similar elements, in which.

DETAILED DESCRIPTION OF EMBODIMENTS

Embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

In the description of the embodiments of the present disclosure, the term "comprise" and similar terms should be understood as open-ended inclusion, namely "including but not limited to". The term "based on" should be understood as "at least partly based on". The term "one embodiment" or "this embodiment" should be understood as "at least one embodiment". The terms "first", "second" and the like can refer to different or the same object. Other explicit and implicit definitions may be included below.

As mentioned above, a conventional OIP bushing uses a composite insulator instead of ceramics as the material of a shell, but there are still some problems, such as creep or stress relaxation of the composite insulator of the bushing during the service life of the bushing.

Specifically, the conventional OIP bushing is used, for example, with a metal housing for leading a current into or out of a transformer, a reactor, a capacitor, a circuit breaker, or another device, and also used with a conductor or a bus passing through a building or a wall, for conductive current-carrying, high-voltage ground insulation and mechanical support.

When used in a transformer, the bushing will be subjected to various physical effects such as voltage, current, tension, vibration and wind power. In order to keep the good connection between components that are located in the bushing and located on a conductive path, the top of the conventional OIP bushing is provided with a strong spring to provide a pre-applied force to a conductive tube to keep the close contact and connection between the components, thereby ensuring the current-carrying capacity of the threaded connection on the current path.

When a tensile force is applied to the conductive tube, the outer composite insulator of the conventional OIP bushing is subjected to an opposite compressive force. This compressive force is usually very large, for example, of the order of 10 tons. During the use of the bushing, the outer composite insulator is subjected to such a large compressive force for a long time, which causes creep or stress relaxation of the outer composite insulator. Such creep or stress relaxation is undesirable for the OIP bushing.

Figure 1:
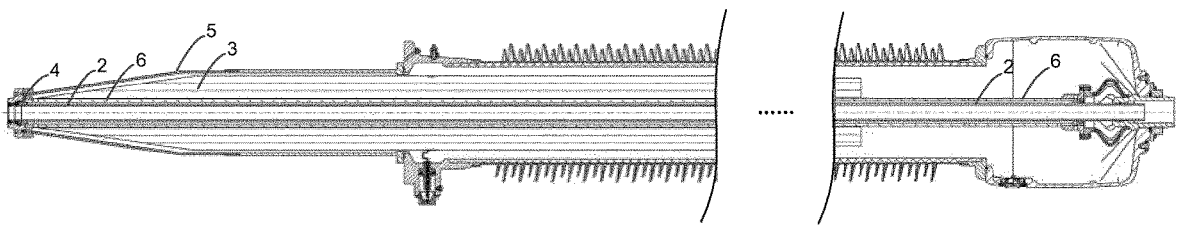
FIG. 1 shows a schematic cross-sectional diagram of a bushing according to an embodiment of the present disclosure.

The embodiments of the present disclosure are specifically described below with reference to the accompanying drawings. FIG. 1 shows a schematic cross-sectional diagram of a bushing 1 according to an embodiment of the present disclosure. The bushing 1 is, for example, an OIP bushing applied in a transformer, and comprises a top portion, a middle portion, and a bottom portion, wherein the middle portion is shown in an omitted manner by ellipses.

The bushing 1 comprises a conductive tube 6 and a central tube 2 which extend from the bottom to the top. In the example of FIG. 1, the conductive tube 6 is located outside the central tube 2. In another example, the conductive tube 6 may be located inside the central tube 2. The conductive tube 6 is made of a metal material suitable for carrying current, and has a circular cross-sectional shape. The central tube 2 is made of metal such as aluminum and copper with a certain physical strength suitable for bearing pressure, or an alloy material such as an aluminum alloy, and also has a circular cross-sectional shape.

Although the conductive tube 6 and the central tube 2 are shown as metal members having a circular shape in FIG. 1, this is only for illustration and is not intended to limit the scope of the present disclosure. For example, the conductive tube 6 and the central tube 2 may have the same or different other cross-sectional shapes. In another example, the central tube 2 may be made of a non-metallic material with a certain physical strength suitable for bearing pressure.

The bushing 1 further comprises a bottom nut 4 located at the bottom, an outer composite insulator 5, and a capacitor core part 3 located between the composite insulator 5 and the conductive bushing. Although FIG. 1 shows a specific shape and configuration of the bushing 1, this is only for illustration and is not intended to limit the scope of the present disclosure. The bushing 1 may have another shape and configuration.

Figure 2:
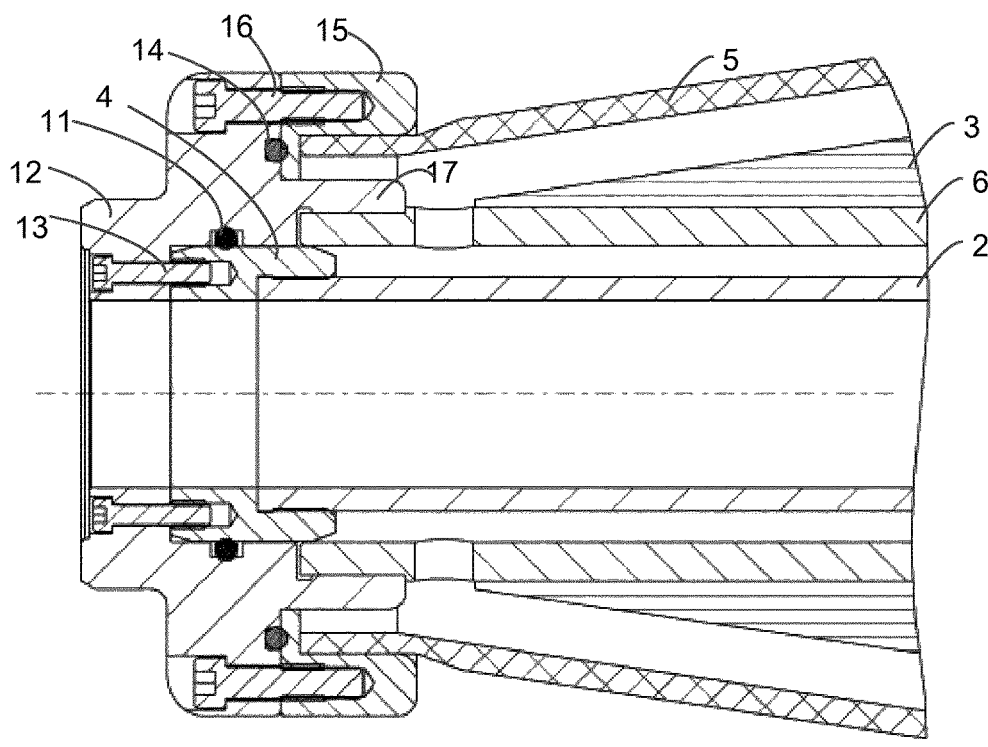
FIG. 2 is a schematic cross-sectional diagram of the bottom of the bushing in FIG. 1.

FIG. 2 is a schematic cross-sectional diagram of the bottom of the bushing 1 in FIG. 1. The bushing 1 comprises a conductive tube 6 and a central tube 2. The conductive tube 6 is fixedly connected to a bottom connecting assembly and a top connecting assembly. The central tube 2 is also fixedly connected to the bottom connecting assembly and the top connecting assembly. For example, a stress such as a compressive force in an extending direction of the central tube 2 is applied to the central tube 2 by a tooling device such as an air cylinder or a hydraulic cylinder, such that the conductive tube 6 has an opposite stress such as a tensile force in an extending direction of the conductive tube 6. In the example of FIG. 2, the bottom connecting assembly comprises a bottom central tube nut 4, a bottom nut 12 and a first bottom bolt 13. The bottom central tube nut 4 has a recess facing the central tube 2, and the central tube 2 is welded to an inner surface of the recess of the bottom central tube nut 4, so that the central tube 2 is fixedly connected to the bottom connecting assembly.

Although the central tube 2 in FIG. 2 is fixedly connected to the bottom connecting assembly by means of welding, this is only for illustration and is not intended to limit the scope of the present disclosure. The central tube 2 may be fixedly connected to the bottom connecting assembly by means of screwing, etc.

The bottom nut 12 has a recess facing the bottom central tube nut 4 to accommodate the bottom central tube nut 4. An upper edge of the bottom central tube nut 4 protrudes from the recess of the bottom nut 12, such that a groove is formed between the upper edge of the bottom central tube nut 4 and an upper edge of the bottom nut 12 to accommodate the conductive tube 6, and the conductive tube 6 is fixedly connected to the bottom nut 12. For example, the conductive tube 6 may be welded or screwed to the bottom nut 12. In another example, the bottom central tube nut 4 and the bottom nut 12 can also be sized such that the conductive tube 6 is tightly clamped.

The bottom nut 12 has a threaded hole passing through the conductive tube 6, and the bottom central tube nut 4 has a threaded hole aligned with this threaded hole, such that the first bottom bolt 13 can fix the bottom central tube nut 4 and the bottom nut 12 together. In another example, the bottom nut 12 may also have a thread on the inner surface of the recess, and an outer surface of the bottom central tube nut 4 has a corresponding thread, such that the bottom central tube nut 4 and the bottom nut 12 can be fixed together by means of screwing.

In FIG. 2, an inside surface of the bottom nut 12 adjacent to the bottom central tube nut 4 is provided with an annular groove. This annular groove is adapted to accommodate a first O-ring 11 for sealing, thereby preventing leakage of oil or other substances.

In an example, the bushing 1 further comprises a flange 15. The flange 15 is aligned with an outer periphery on an outer side of a projecting rim 17 of the bottom nut 12 and fixedly connected to the bottom nut 12 via a second bolt 16. In an example, the flange 15 and the composite insulator 5 may be integrally formed. In another example, the flange 15 and the composite insulator 5 may be formed of different materials, respectively.

An outer peripheral surface of the bottom nut 12 adjacent to the flange 15 is provided with an annular groove. This annular groove is adapted to accommodate a second O-ring 14 for sealing, thereby preventing leakage of oil or other substances.

In an example, the composite insulator 5 is located outside the conductive tube, and the bottom of the composite insulator 5 is adapted to be sandwiched between the flange and the projecting rim of the bottom nut. In another example, the bottom of the composite insulator 5 may be fixed to the flange 15 by means of gluing or in another manner.

Although FIG. 2 shows a specific shape and configuration of the bottom of the bushing 1, this is only for illustration and is not intended to limit the scope of the present disclosure. The bushing 1 may have another shape and configuration.

Figure 3:
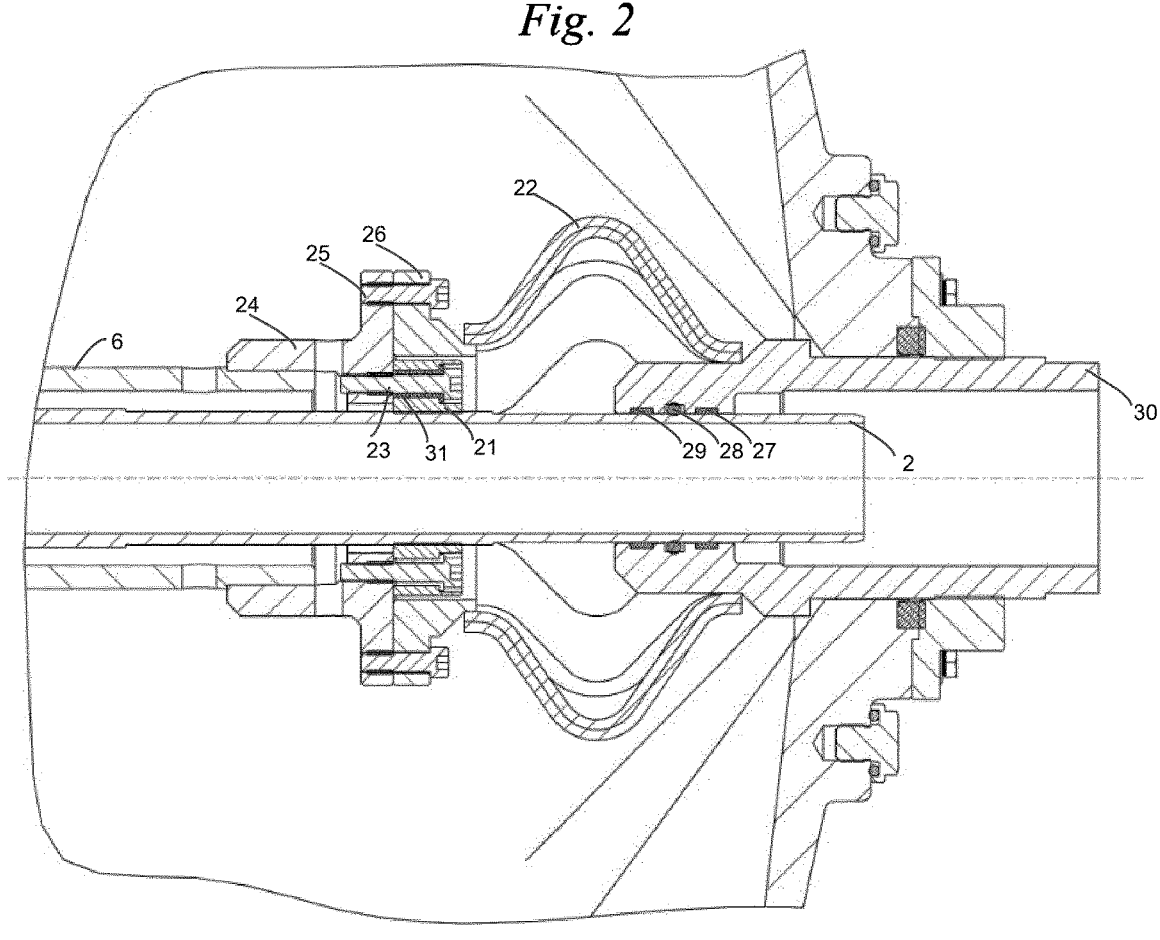
FIG. 3 is a schematic cross-sectional diagram of the top of the bushing in FIG. 1.

FIG. 3 is a schematic cross-sectional diagram of the top of the bushing 1 in FIG. 1. In an example, the top connecting assembly of the bushing 1 comprises a top central tube nut 21, a top nut 24 and a first top bolt 23. The top central tube nut 21 has a central through hole for the central tube 2 to pass through, and the central tube 2 may be fixedly connected to the top central tube nut 21 by means of screwing or welding.

The top nut 24 has a recess for accommodating the conductive tube 6, and the conductive tube 6 may be fixedly connected to the top nut 24 by means of screwing or welding. The bottom of the top nut 24 is provided with a threaded hole located outside the central through hole, and the top central tube nut 21 is provided with a threaded through hole aligned with this threaded hole, such that the first top bolt 23 can fix the top nut 24 and the top central tube nut 21 together.

In an example, the top connecting assembly of the bushing 1 further comprises a connecting flange 26. The connecting flange 26 is disposed outside the top central tube nut 21 and aligned with an outer periphery of the top nut 24. The outer periphery of the top nut 24 is also provided with a threaded hole, and the connecting flange 26 is provided with a threaded through hole aligned with this threaded hole, such that a second top bolt 25 can fix the top nut 24 and the connecting flange 26 together.

In another example, the connecting flange 26 may be configured to be fixed to the top nut 24 in a screwed manner, or the connecting flange and the top nut may be integrally formed. In an example, the bushing 1 may further comprise a flexible conductive connecting member 22. The flexible conductive connecting member 22 has a curved shape and is electrically coupled to the connecting flange 26, for example, by means of welding or bolting. In an example, the flexible conductive connecting member 22 comprises a plurality of layers of current-carrying metal members.

In an example, the bushing 1 further comprises a conductive sleeve 30. The conductive sleeve 30 is configured to be electrically coupled to the flexible conductive connecting member 22, for example, by means of welding or bolting, and an inner surface of the conductive sleeve 30 is adjacent to the outer surface of the central tube 2. In addition, the conductive sleeve 30 is disposed at a certain distance from the top central tube nut 21.

In an example, the bushing 1 further comprises an insulating isolation sleeve 31. The insulating isolation sleeve 31 is configured to be located between the top central tube nut 21 and the first top bolt 23 to electrically insulate the top central tube nut 21 from the first top bolt 23. In this case, a conductive path of the bushing 1 extends from the conductive sleeve 30 to the bottom nut 12 through the flexible conductive connecting member 22, the connecting flange 26, the top nut 24 and the conductive tube 6. In this way, the current is prevented from branching at the top and being transmitted from the flexible conductive connecting member 22 to the conductive tube 6 via a plurality of paths.

A part of the inner surface of the conductive sleeve 30 and the outer surface of the central tube 2 has at least one groove, and the at least one groove is adapted to accommodate at least one of an O-ring and a sliding seal. In FIG. 3, the at least one groove is shown as a first groove for accommodating an 0-shaped sealing ring 27, a second groove for accommodating a sliding seal 28, and a third groove for accommodating an 0-shaped sealing ring 29. It can be understood that in some other examples, the conductive sleeve 30 may have one or more grooves. In an example, the 0-shaped sealing ring 27 and the 0-shaped sealing ring 29 are, for example, polytetrafluoroethylene (PTFE) rings.

The conductive sleeve 30 is configured to slidably move in a longitudinal direction relative to the central tube 2 when the conductive sleeve 30 receives an external force. In addition, since the conductive sleeve 30 and the central tube 2 are configured to be mutually movable with respect to each other, even if the central tube 2 is configured to be subjected to a stress such as a compressive force, the central tube 2 is not transmitted to a composite insulator shell of the bushing 1 through the conductive sleeve 30.

Correspondingly, during the use of the bushing 1, even if the composite insulator shell of the bushing 1 is stressed, the stress is not transmitted to the central tube 2. Therefore, during the use of the bushing 1, the pre-applied compressive stress of the central tube 2 can cause a tensile stress on the conductive tube 6, thereby ensuring tight connection or contact between components on the conductive path and ensuring the current-carrying capacity of the threaded connection on the current path.

In an example, the bushing 1 further comprises at least one supporting member (not shown). The at least one supporting member is located between the central tube 2 and the conductive tube 6. For example, the at least one supporting element may be located between the central tube 2 and the conductive tube 6 at any position in the extending direction of the central tube 2, and is arranged between a recess on an outer side wall of the central tube 2 and a corresponding recess on an inner side wall of the conductive tube 6. Since a prestress such as a compressive force is applied to the central tube 2, bending of the central tube 2 caused by the stress in the transverse direction perpendicular to the extending direction of the central tube 2 can be prevented by providing the supporting element.

Although FIG. 3 shows a specific shape and configuration of the top of the bushing 1, this is only for illustration and is not intended to limit the scope of the present disclosure. The bushing 1 may have another shape and configuration.

Figure 4:
FIG. 4 shows a schematic flowchart of a method for manufacturing a bushing according to an embodiment of the present disclosure.
Figure 4:
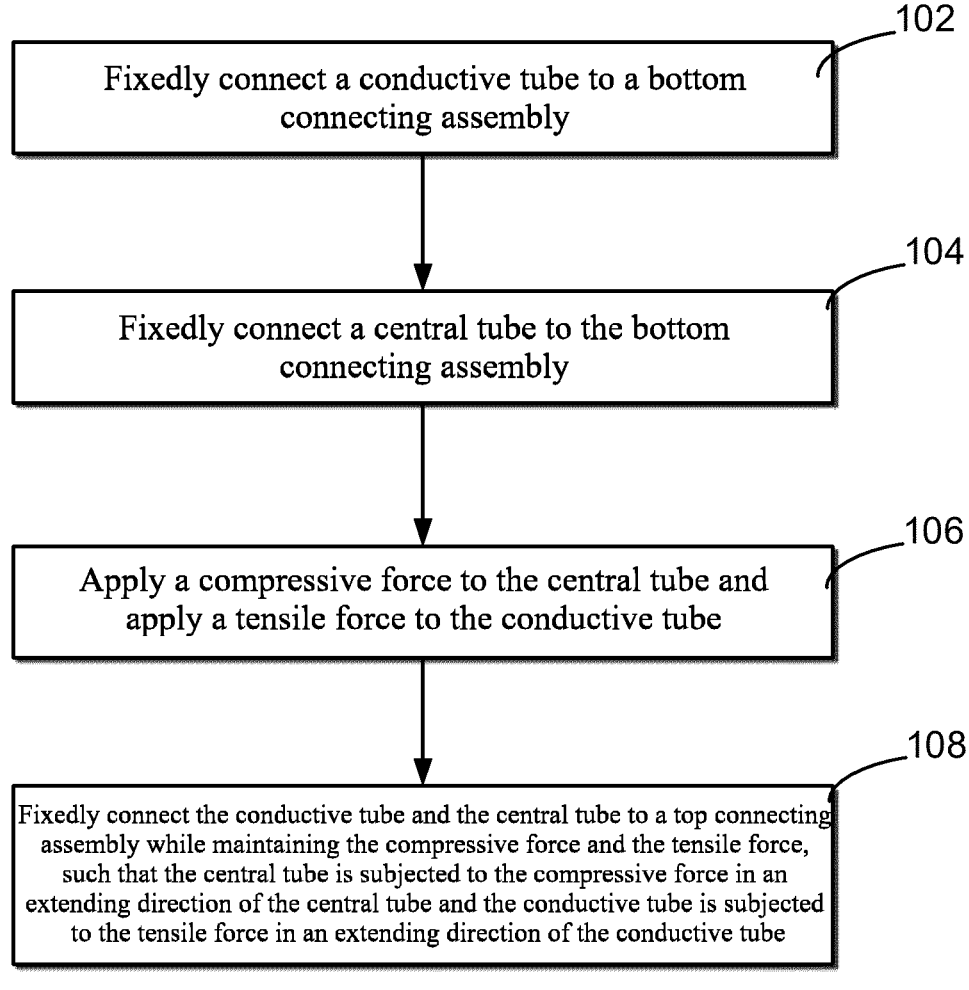

FIG. 4 shows a schematic flowchart of a method for manufacturing a bushing 100 according to an embodiment of the present disclosure.

In step 102, a conductive tube is fixedly connected to a bottom connecting assembly. In an example, the bottom connecting assembly may be the bottom connecting assembly described with reference to FIG. 2, and the conductive tube may be fixedly connected to the bottom connecting assembly by means of welding or other mechanical fixing means such as screwing.

In step 104, a central tube is fixed to the bottom connecting assembly. In an example, the bottom connecting assembly may be the bottom connecting assembly described with reference to FIG. 2, and the conductive tube may be fixedly connected to the bottom connecting assembly by means of welding or other mechanical fixing means such as screwing.

In step 106, a compressive force is applied to the central tube and a tensile force is applied to the conductive tube. In an example, the compressive force and the tensile force may be applied by a tooling device such as an air cylinder or a hydraulic cylinder.

In step 108, the conductive tube and the central tube are fixedly connected to a top connecting assembly while maintaining the compressive force and the tensile force, such that the central tube is subjected to the compressive force in an extending direction of the central tube and the conductive tube is subjected to the tensile force in an extending direction of the conductive tube.

In an example, the top central tube nut pre-screwed on the central tube is screwed into contact with the top nut on the conductive tube while maintaining the compressive force and the tensile force, and is finely adjusted to align threaded holes of the two nuts with each other. The compressive force and the tensile force continue to be maintained, and an insulating isolation sleeve 31 and a first top bolt 23 are installed to connect the two nuts. Then, the tooling device for applying the forces is withdrawn, and the central tube and the conductive tube are thus subjected to the applied prestresses.

The method for manufacturing a bushing according to the embodiment of the present disclosure has been generally described above. It can be understood that the features described with respect to FIGS. 1-3 are all applicable to the manufacturing method with respect to FIG. 4.

In an example, the bottom connecting assembly comprises a bottom central tube nut, a bottom nut and a first bottom bolt. The method further comprises welding the central tube to the bottom central tube nut, and fixedly connecting the conductive tube to the bottom nut. The bottom central tube nut is fixedly connected to the bottom nut via the first bottom bolt.

In an example, an inner surface of the bottom nut adjacent to the bottom central tube nut is provided with an annular groove. The method further comprises accommodating in the annular groove a first O-ring for sealing.

In an example, the top connecting assembly comprises a top central tube nut, a top nut and a first top bolt. The method further comprises fixedly connecting the central tube to the top central tube nut, and fixedly connecting the conductive tube to the bottom nut. The top central tube nut is fixedly connected to the top nut via the first top bolt.

In an example, the method further comprises aligning a connecting flange with an outer periphery of the top nut, and fixedly connecting the connecting flange to the top nut via a second top bolt. A flexible conductive connecting member having a curved shape is coupled to the connecting flange, and a conductive sleeve is coupled to the flexible conductive connecting member.

In an example, the method further comprises arranging at least one supporting member between the central tube and the conductive tube to prevent the central tube from bending in a transverse direction perpendicular to the extending direction of the central tube; and arranging an insulating isolation sleeve between the top central tube nut and the first top bolt to electrically insulate the top central tube nut from the first top bolt.

Some exemplary embodiments according to the present disclosure are listed below.

Item 1: A bushing is provided. The bushing comprises: a conductive tube and a central tube. The conductive tube is fixedly connected to a bottom connecting assembly and a top connecting assembly. The central tube is fixedly connected to the bottom connecting assembly and the top connecting assembly, wherein the central tube is subjected to a compressive force in an extending direction of the central tube, such that the conductive tube is subjected to a tensile force in an extending direction of the conductive tube.

Item 2: The bushing according to item 1, wherein the central tube is located inside the conductive tube and is a metal tube or an alloy tube.

Item 3: The bushing according to item 1 or 2, wherein the bottom connecting assembly comprises a bottom central tube nut, a bottom nut and a first bottom bolt. The central tube is welded to the bottom central tube nut. The conductive tube is fixedly connected to the bottom nut. The bottom central tube nut is fixedly connected to the bottom nut via the first bottom bolt.

Item 4: The bushing according to any one of items 1 to 3, wherein an inner surface of the bottom nut adjacent to the bottom central tube nut is provided with an annular groove. The annular groove is adapted to accommodate a first O-ring for sealing.

Item 5: The bushing according to any one of items 1 to 4, wherein the bushing further comprises a flange. The flange is aligned with an outer periphery on an outer side of a projecting rim of the bottom nut and fixedly connected to the bottom nut via a second bolt.

Item 6: The bushing according to any one of items 1 to 5, wherein an outer peripheral surface of the bottom nut adjacent to the flange is provided with an annular groove. The annular groove is adapted to accommodate a second O-ring for sealing.

Item 7: The bushing according to any one of items 1 to 6, wherein the bushing further comprises a composite insulator. The composite insulator is located outside the conductive tube, and the bottom of the composite insulator is adapted to be sandwiched between the flange and projecting rim of the bottom nut.

Item 8: The bushing according to any one of items 1 to 7, wherein the top connecting assembly comprises a top central tube nut, a top nut and a first top bolt. The central tube is fixedly connected to the top central tube nut, and the conductive tube is fixedly connected to the top nut. The top central tube nut is fixedly connected to the top nut via the first top bolt.

Item 9: The bushing according to any one of items 1 to 8, wherein the top connecting assembly further comprises a connecting flange. The connecting flange is aligned with an outer periphery of the top nut and fixedly connected to the top nut via a second top bolt.

Item 10: The bushing according to any one of items 1 to 9, wherein the bushing further comprises a flexible conductive connecting member. The flexible conductive connecting member has a curved shape and is electrically coupled to the connecting flange.

Item 11: The bushing according to any one of items 1 to 10, wherein the bushing further comprises a conductive sleeve. The conductive sleeve is electrically coupled to the flexible conductive connecting member, and an inner surface of the conductive sleeve is adjacent to an outer surface of the central tube.

Item 12: The bushing according to any one of items 1 to 11, wherein the flexible conductive connecting member comprises a plurality of layers of current-carrying metal members. A part of the inner surface of the conductive sleeve and the outer surface of the central tube has at least one groove. The at least one groove is adapted to accommodate at least one of an O-ring and a sliding seal.

Item 13: The bushing according to any one of items 1 to 11, wherein the bushing further comprises at least one supporting element and an insulating isolation sleeve. The at least one supporting member is located between the central tube and the conductive tube to prevent the central tube from bending in a transverse direction perpendicular to the extending direction of the central tube. The insulating isolation sleeve is located between the top central tube nut and the first top bolt to electrically insulate the top central tube nut from the first top bolt.

Item 14: A transformer is provided. The transformer comprises a bushing according to any one of items 1 to 13.

Item 15: A method for manufacturing a bushing is provided. The method comprises fixedly connecting a conductive tube to a bottom connecting assembly; fixedly connecting a central tube to the bottom connecting assembly; applying a compressive force to the central tube and applying a tensile force to the conductive tube; and fixedly connecting the conductive tube and the central tube to a top connecting assembly while maintaining the compressive force and the tensile force, such that the central tube is subjected to the compressive force in an extending direction of the central tube and the conductive tube is subjected to the tensile force in an extending direction of the conductive tube.

Item 16: The method according to item 15, wherein the bottom connecting assembly comprises a bottom central tube nut, a bottom nut and a first bottom bolt. The central tube is welded to the bottom central tube nut, and the conductive tube is fixedly connected to the bottom nut. The bottom central tube nut is fixedly connected to the bottom nut via the first bottom bolt.

Item 17: The method according to item 15 or 16, wherein an inner surface of the bottom nut adjacent to the bottom central tube nut is provided with an annular groove. The annular groove is adapted to accommodate a first O-ring for sealing.

Item 18: The method according to any one of items 15 to 17, wherein the top connecting assembly comprises a top central tube nut, a top nut and a first top bolt. The central tube is fixedly connected to the top central tube nut, and the conductive tube is fixedly connected to the top nut. The top central tube nut is fixedly connected to the top nut via the first top bolt.

Item 19: The method according to any one of items 15 to 18, wherein the method further comprises aligning a connecting flange with an outer periphery of the top nut, and fixedly connecting the connecting flange to the top nut via a second top bolt; coupling a flexible conductive connecting member having a curved shape to the connecting flange; and coupling a conductive sleeve to the flexible conductive connecting member.

Item 20: The method according to any one of items 15 to 19, wherein the method further comprises arranging at least one supporting member between the central tube and the conductive tube to prevent the central tube from bending in a transverse direction perpendicular to the extending direction of the central tube; and arranging an insulating isolation sleeve between the top central tube nut and the first top bolt to electrically insulate the top central tube nut from the first top bolt.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A bushing, comprising:
   a conductive tube fixedly connected to a bottom connecting assembly and a top connecting assembly; and
   a central tube fixedly connected to the bottom connecting assembly and the top connecting assembly, wherein the central tube comprises a hollow tube that is located inside the conductive tube, and wherein the central tube is subjected to a compressive force in an extending direction of the central tube, such that the conductive tube is subjected to a tensile force in an extending direction of the conductive tube,
   wherein the central tube and the conductive tube are pre-stressed to maintain engagement with each other under axial loading without applying axial force beyond the top and bottom connecting assemblies.

2. The bushing as claimed in claim 1, wherein the central tube is a metal tube or an alloy tube.

3. The bushing as claimed in claim 2, wherein the bottom connecting assembly comprises:
   a bottom central tube nut, the central tube being welded to the bottom central tube nut;
   a bottom nut, the conductive tube being fixedly connected to the bottom nut; and
   a first bottom bolt via which the bottom central tube nut is fixedly connected to the bottom nut.

4. The bushing as claimed in claim 3, wherein an inner surface of the bottom nut adjacent to the bottom central tube nut is provided with an annular groove adapted to accommodate a first O-ring for sealing.

5. The bushing as claimed in claim 3, further comprising a flange, which is aligned with an outer periphery on an outer side of a projecting rim of the bottom nut and fixedly connected to the bottom nut via a second bolt.

6. The bushing as claimed in claim 5, wherein an outer peripheral surface of the bottom nut adjacent to the flange is provided with an annular groove adapted to accommodate a second O-ring for sealing.

7. The bushing as claimed in claim 6, further comprising a composite insulator, wherein the composite insulator is located outside the conductive tube, and the bottom of the composite insulator is adapted to be sandwiched between the flange and the projecting rim of the bottom nut.

8. The bushing as claimed in claim 2, wherein the top connecting assembly comprises:
   a top central tube nut, the central tube being fixedly connected to the top central tube nut;
   a top nut, the conductive tube is fixedly connected to the top nut; and
   a first top via which the top central tube nut is fixedly connected to the top nut.

9. The bushing as claimed in claim 8, wherein the top connecting assembly further comprises a connecting flange, and the connecting flange is aligned with an outer periphery of the top nut and fixedly connected to the top nut via a second top bolt.

10. The bushing as claimed in claim 9, further comprising a flexible conductive connecting member, wherein the flexible conductive connecting member has a curved shape and is electrically coupled to the connecting flange.

11. The bushing as claimed in claim 10, further comprising:
   a conductive sleeve electrically coupled to the flexible conductive connecting member, an inner surface of the conductive sleeve being adjacent to an outer surface of the central tube.

12. The bushing as claimed in claim 11, wherein the flexible conductive connecting member comprises a plurality of layers of current-carrying metal members, a part of the inner surface of the conductive sleeve and the outer surface of the central tube has at least one groove, and the at least one groove is adapted to accommodate at least one of an O-ring and a sliding seal.

13. The bushing as claimed in claim 8, further comprising:
   at least one supporting member located between the central tube and the conductive tube to prevent the central tube from bending in a transverse direction perpendicular to the extending direction of the central tube; and an insulating isolation sleeve located between the top central tube nut and the first top bolt to electrically insulate the top central tube nut from the first top bolt.

14. The bushing as claimed in claim 2, wherein the bottom connecting assembly comprises:

a bottom central tube nut, the central tube being welded to the bottom central tube nut;

a bottom nut, the conductive tube being fixedly connected to the bottom nut; and a first bottom bolt via which the bottom central tube nut is fixedly connected to the bottom nut.

15. The bushing as claimed in claim 14, wherein an inner surface of the bottom nut adjacent to the bottom central tube nut is provided with an annular groove adapted to accommodate a first O-ring for sealing.

16. The bushing as claimed in claim 14, further comprising a flange, which is aligned with an outer periphery on an outer side of a projecting rim of the bottom nut and fixedly connected to the bottom nut via a second bolt.

17. The bushing as claimed in claim 16, wherein an outer peripheral surface of the bottom nut adjacent to the flange is provided with an annular groove adapted to accommodate a second O-ring for sealing.

18. A transformer, comprising:

a bushing having:

a conductive tube fixedly connected to a bottom connecting assembly and a top connecting assembly; and a central tube fixedly connected to the bottom connecting assembly and the top connecting assembly, wherein the central tube comprises a hollow tube that is located inside the conductive tube, and wherein the central tube is subjected to a compressive force in an extending direction of the central tube, such that the conductive tube is subjected to a tensile force in an extending direction of the conductive tube, wherein the central tube and the conductive tube are pre-stressed to maintain engagement with each other under axial loading without applying axial force beyond the top and bottom connecting assemblies.

19. A bushing, comprising:

a bottom connecting assembly;

a top connecting assembly;

an electrically conductive tube connected to the bottom connecting assembly and the top connecting assembly;

a central tube connected to the bottom connecting assembly and the top connecting assembly, wherein the central tube comprises a hollow tube that is located inside the electrically conductive tube, and wherein the central tube is subjected to a compressive force in a first direction by the bottom connecting assembly and the top connecting assembly, and the electrically conductive tube is subjected to a tensile force in the first direction by the bottom connecting assembly and the top connecting assembly, wherein the central tube and the conductive tube are pre-stressed to maintain engagement with each other under axial loading without applying axial force beyond the top and bottom connecting assemblies.

* * * * *